(12) United States Patent
Edge

(10) Patent No.: US 7,738,142 B2
(45) Date of Patent: Jun. 15, 2010

(54) ESTIMATING COLOR OF A COLORANT DEPOSITED ON A SUBSTRATE

(75) Inventor: Christopher J. Edge, St. Paul, MN (US)

(73) Assignee: Eastman Kodak Company, Rochester, NJ (US)

( * ) Notice: Subject to any disclaimer, the term of this patent is extended or adjusted under 35 U.S.C. 154(b) by 793 days.

(21) Appl. No.: 11/560,142

(22) Filed: Nov. 15, 2006

(65) Prior Publication Data

US 2008/0111997 A1    May 15, 2008

(51) Int. Cl.
*H04N 1/40* (2006.01)
(52) U.S. Cl. .................................. 358/1.9; 358/527
(58) Field of Classification Search ................. 358/1.9, 358/2.1, 502, 504, 527
See application file for complete search history.

(56) References Cited

U.S. PATENT DOCUMENTS

| | | | | |
|---|---|---|---|---|
| 3,848,856 | A | * 11/1974 | Reeber et al. | ............... 358/527 |
| 5,933,578 | A | 8/1999 | Van de Capelle et al. | ... 395/109 |
| 5,982,924 | A | * 11/1999 | Power et al. | ................ 382/162 |
| 6,654,143 | B1 | 11/2003 | Dalal et al. | |

FOREIGN PATENT DOCUMENTS

| | | |
|---|---|---|
| WO | WO 98/46008 | 10/1998 |
| WO | WO 03/095212 | 11/2003 |

OTHER PUBLICATIONS

U.S. Appl. No. 11/375,349, filed Mar. 14, 2006, entitled, Techniques for Predicting Colorimetric Measurements of Mixed Subtractive Colors, by Christopher J. Edge.
Patrick Emmel et al.; A Unified Model for Color Prediction of Halftoned Prints; Journal of Imaging Science and Technology, vol. 44, No. 4, Jul./Aug. 2000, pp. 351-359.
Roy S. Berns; Spectral modeling of a dye diffusion thermal transfer printer; Journal of Electronic Imaging, Oct. 1993, vol. 2(4), pp. 359-370.
Raja Balasubramanian; Optimization of the spectral Neugebauer model for printer characterization; Journal of Electronic Imaging, Apr. 1999, vol. 8(2), pp. 156-166.
Henry R. Kang; Applications of color mixing models to electronic printing; Journal of Electronic Imaging, Jul. 1994, vol. 3(3), pp. 276-287.
Mark Shaw et al.; Color Printer Characterization Adjustment for Different Substrates; COLOR research and application, Dec. 2003, vol. 28, No. 6, pp. 454-467.

* cited by examiner

*Primary Examiner*—Edward L Coles
*Assistant Examiner*—Stephen M Brinich
(74) *Attorney, Agent, or Firm*—Nelson Adrian Blish

(57) ABSTRACT

Systems and methods are provided that accurately estimate a post-printing appearance of a color on a substrate. In addition, systems and methods are provided that accurately estimate a post-mixing appearance of several colors mixed on a substrate.

11 Claims, 3 Drawing Sheets

Cyan and Magenta Dots
No smear or stain

Cyan and Magenta Dots
Showing exaggerated smear and stain

ESTIMATING COLOR OF A COLORANT DEPOSITED ON A SUBSTRATE

CROSS-REFERENCE TO RELATED APPLICATION

This application is related to U.S. patent application Ser. No. 11/560,156, now U.S. Patent Publication No. 2008/0111998, filed Nov. 15, 2006, titled "Estimating Color of Colorants Mixed on a Substrate," by Christopher Edge, filed, the entire disclosure of which is hereby incorporated herein by reference.

FIELD OF THE INVENTION

This invention relates to estimating an output calorimetric value of an N-color printing system.

BACKGROUND OF THE INVENTION

A. Individual Spot Colors (Solids and Tints)

Workflows and proofing systems such as Prinergy™/Evo, Veris™, and InSite™, known in the art, typically provide a means to support spot colors, i.e., extra printing inks beyond the normal cyan, magenta, yellow, and black ("CMYK") process colors. (Prinergy and Veris are Trademarks of Eastman Kodak Company, Rochester, N.Y.). A standard list of color names and their solid L*a*b* measurements, such as the Pantone™ library, have been provided as a way to identify spot colors. (Pantone is a Trademark of Pantone, Inc., a Corporation of Delaware located at 590 Commerce Boulevard, Carlstadt, N.J. 07072-3098.) Colors not included in these standard lists can be identified by users capable of providing CIELAB or spectral measurements of such colors. Conventional historical proofing systems, such as the Rainbow™ Desktop Proofing System, provided users with the ability to add CIELAB measurements of not only solid spot colors, but tinted (i.e. less than 100% density) spot colors also. (Rainbow is a Trademark of Kodak Polychrome Graphics, an LLC of Delaware located at 401 Merritt #7 Norwald, Conn. 06851.) These conventional proofing systems could perform simple spline interpolations in order to simulate the printed appearance of such tinted spot colors.

Spot color processing is typically performed by raster image processing ("RIPing") an EPS or PDF file, known in the art, containing red-green-blue ("RGB") or CMYK images as well as vector objects containing spot colors. If the destination is a press with only CMYK inks, the vector objects are converted to CMYK approximations, which are often embedded in the file with the spot color names. If the destination press actually supports the requested spot color inks, the file is RIPed into a separate bit map plane for C, M, Y, and K, as well as a separate bit map plane for each destination spot color.

However, these conventional workflows and proofing systems have limitations when spot colors are used. One shortcoming is that although good color management infrastructure exists for handling CMYK, the same is not true for spot colors. For example, if a file prepared for standard SWOP requires conversion for printing on newsprint, CMYK images can be converted using a specific source and destination profile. However, it is difficult to convert spot colors properly since such a conversion requires the equivalent of a unique profile for each spot color for both source and destination.

Another shortcoming is that in the conventional workflows and proofing systems, accurately proofing or estimating the appearance of spot colors after printing is challenging both in terms of infrastructure and measurements required. In particular, the number of calculations involved in the estimating and the size of the look-up-tables (LUTs) needed for the calculations increase exponentially with every additional color added to the mix. For example, if four colors, C, M, Y, K, are printed, the number of calculations and the size of the LUTs are derived from a number raised to an exponent of four, whereas if five colors, C, M, Y, K, plus one spot color are printed, the number of calculations and the size of the LUTs are derived from a number raised to an exponent of five. This shortcoming is compounded when using a single database of spot color values for use in many different print conditions that differ in dot gain, substrate color, etc.

Yet another shortcoming is that even expensive contract proofing systems cannot print sharp, well-defined dots as compared with actual print jobs on a press that often result in very soft-edged dots, which may in fact demonstrate a slight smearing of the dots, which reduces their ink film thickness and which may also stain the non-imaged region adjacent to the dot. (Accordingly, "smearing" and "staining" effects often are referred to interchangeably herein.) By viewing such print jobs under a magnifying glass, one can often detect that the density of dots is somewhat less than that of solid. As illustrated with FIGS. 5 and 6, one can also detect that the "holes" of the halftone screen (i.e. areas where substrate is visible in between the colorant dots) are stained by the ink used to print the dots. Hence, the maximum density Dmax of the dots is reduced whereas the minimum density Dmin of the adjacent substrate holes is increased by ink stain, both due to the phenomenon of dot or ink smearing. Visually, this phenomenon results in spot color tints that are potentially "cleaner" (i.e., higher $L^*$ for a given $C^*$) as well as potentially shifted in hue on the print job from the press as compared to the halftone proof.

Accordingly, a need in the art exists for improved color management and proofing techniques pertaining to the use of spot colors.

B. Mixing of Colors

For many years, algorithms and applications have existed for estimating the result of printing and mixing halftone dots, as well as for mixing paints, dyes, etc. Generally, these calculations have been spectrally-based, meaning that full spectral information (as opposed to tristimulous data) was required regarding both colorants and substrates in order to estimate how they would add together to create a resulting color.

These methods have been used to create characterizations of N color printing systems where the ink sets are fixed. For CMYK, or N=4 systems, very accurate characterizations and corresponding ICC profiles have been generated by many products such as Kodak Profile Wizard and Gretag Profile-Maker using standard four-color charts such as IT8.7/4:2005 which has 1617 patches. For larger values of N, such as seven-color ink systems, products are now available to create seven-color ICC profiles using custom charts. The challenge with such characterizations is that the sampling of the seven color space is extremely sparse with higher dimensionality and that the sampling of the multidimensional grid of the ICC profile is also very sparse (typically a grid sampling of three or four per dimension rather than 17). This sparse sampling of both characterization data and of the corresponding profile can lead to inaccuracies in both proofing and color conversions.

For N-color printing systems where the color set is not fixed, the existing problem facing users of spot colors is far more complicated. There may be hundreds or thousands of spot colors in the spot color database. In order to achieve comparable quality to an ICC profile built from CMYK charts, an astronomical number of color combinations and measurements would have to be performed.

One conventional scheme for modeling N-color printing systems was introduced by Vigianno in 1990 with the work, "Modeling the Color of Multi-Color Halftones", TAGA Proceedings, p.44-62, Technical Association of the Graphic Arts, 1990. This work defined new spectral Neugebauer equations, which combined spectral Neugebauer:

$$R(\lambda) = \sum_{j,k,l,m=0}^{j,k,l,m=1} R(\lambda)_{jklm} a_{jklm} \quad \text{Eq. 1}$$

for $j = 0, 1 => C = 0, 1.0$ $k = 0, 1 => M = 0, 1.0$ $l = 0, 1 => M = 0, 1.0$ $m = 0, 1 => K = 0, 1.0$ with a dot gain correction:

$$a_p = a_f + 2\Delta_p [a_f(1-a_f)]^{1/2} \quad \text{Eq. 2}$$

with the Yule-Nielson correction:

$$R = [(1-k)R_p^\mu + kR_k^\mu]^n \quad \text{Eq. 3}$$

The modified expression for R is substituted in the summation over all the R's in equation 1. These equations provide a way to estimate the resulting appearance of mixed or overprinted halftone dots of different colors.

Estimating the resulting appearance of mixed solid inks of varying thicknesses was addressed by Kubelka-Munk in, "Modeling Ink-Jet Printing: Does Kubelka-Munk Theory Apply?", L. Yang Proc. IS&T NIP18 Conf. 482-485, Sep. 29-Oct. 4, 2002, San Diego, Calif., USA. The Kubelka-Munk equation defines reflectance for multiple colorants on a substrate, where the colorants have both an absorption coefficient (k) and a scattering coefficient (s) as a function of wavelength $\lambda$.

$$R(\lambda, z) = \frac{(R_\infty - R_g)e^{-(1/R_\infty - R_\infty)sz} - R_\infty(1 - R_g R_\infty)}{R_\infty(R_\infty - R_g)e^{-(1/R_\infty - R_\infty)sz} - (1 - R_g R_\infty)} \quad \text{Eq. 4}$$

where $$R_\infty = 1 + \frac{k(\lambda)}{s(\lambda)} - \sqrt{\left(\frac{k(\lambda)}{s(\lambda)}\right)^2 + 2\frac{k(\lambda)}{s(\lambda)}} \quad \text{Eq. 5}$$

The conventional calculations, discussed above, are useful when full spectral data is known for each of the colors being mixed and if one has information characterizing $k(\lambda)$ and $s(\lambda)$. However, one often does not have full spectral data particularly in an ICC workflow (which is inherently L*a*b* centric). Often one only has a generic set of measured color data printed on one substrate stock for the colors being mixed, such as measured CIELAB data. Accordingly, a need in the art exists for an accurate way to estimate the resulting appearance or color of individual spot colors on various substrate stocks without having to physically measure the appearance of each of the colors to be mixed on such various substrate stocks. The need likewise exists to estimate a reasonable estimate of the solid overprints of spot colors even when only the generic data above is available.

Furthermore, even if one has spectral data for each individual colorant, typically one does not have a definition for $k(\lambda)$ and $s(\lambda)$. Conventional methods typically involve printing each colorant against (at least) a black background as well as white, measuring the spectra of each in order to infer these functions of $\lambda$. Indeed, if such data is available, inferring the above expressions is relatively easy. However, obtaining such measurements may not be practical.

A reason why existing methods of profiling spot colors have been limited in quality or unreasonably complex to implement, is because there has been lacking a good fundamental model that describes the printing processes being used. If a truly valid model can be constructed, typically one can estimate the behavior of a process using a very small number of parameters that each have an associated physical correlation to the system being characterized. In the event that certain properties must be characterized with a function of wavelength (for example the combined effects of for $k(\lambda)$ and $s(\lambda)$, or other wavelength effects such as internal reflection between colorant layers which is dependent on the index of refraction $n(\lambda)$) one can still ascertain this information via least squares fit to actual data using the accurate physical model.

Such a model would be of value because static N-color profiles (profiles of fixed colorant sets) can be more effectively created using less measurement with maximum accuracy. Even if overprints are only estimated imperfectly by the proposed model, it can be easily corrected empirically using inter-channel correction factors in order to achieve a high degree of accuracy. This is due to the fact that the Neugebauer primaries (i.e. the various possible combinations of solid colorants) are well-defined and are available for measurement in the form of test charts.

Accordingly, a need in the art exists for a good fundamental model and implementations thereof that describes the printing processes being used.

SUMMARY OF THE INVENTION

The above-described problems are addressed and a technical solution is achieved in the art by a system and a method for estimating a resulting color value of (a) a colorant when deposited on a substrate and (b) a plurality of colorants when mixed on a substrate according to various embodiments of the present invention. (The terms "mix", "mixed", or "mixing" are intended to include any mixing of colorants, including the overprinting of colorants on a substrate.)

Embodiments of the present invention include computer-based systems and computer-implemented methods that use channel-independent information that quantifies key properties of each channel as characterized by a mathematical model that is based on the physics of the printing system. This model is capable of characterizing not only the behavior of individual colorants when they are printed but also the interactions between the colorants and their effects upon one another when mixed and estimates accurately the final measured result for any combination of device code values (e.g., CMYK or CMYK+Spot values) for the set of colorants printed. In the case where a complete measured data set is available for a specific set of N colors, inter-channel or inter-colorant corrections specific to that data set can be applied in the above systems and methods in order to achieve optimal accuracy even if the data set is somewhat sparsely sampled, which is commonly the case for a specific set of N colorants, especially when N>=5.

In the case of a single colorant, which may or may not be a spot colorant, deposited on a substrate (without mixing with other colorants), according to an embodiment of the present invention, computer-based systems and computer-implemented methods that estimate a resulting color value of the colorant when deposited on the substrate are provided. According to an embodiment of the present invention, the estimation of the resulting color value is based at least upon smear information associated with the colorant, as well as color information associated with the colorant and the substrate. The smear information, according to an embodiment of the present invention, describes smear characteristics associated with the colorant, such as an amount of spreading of a printed dot of the colorant. The color information describes a color value of the colorant and a color value of the substrate. The color values may be device-dependent color values or device-independent color values, such as CIELAB color values. In this regard, the estimated resulting color value may be in device-dependent or device-independent form.

According to an embodiment of the present invention, the estimation of the resulting color value of the colorant deposited on the substrate additionally is based at least upon dot size increase information associated with the colorant. According to an embodiment of the present invention, the dot size increase information describes an amount of growth of a printed dot of the colorant.

According to an embodiment of the present invention, tint of the colorant when deposited on the substrate may additionally be considered. Tint of the colorant refers to an amount of printed coverage of the colorant on the substrate, where, for example, full tint refers to 100% coverage (i.e., printing of the colorant in a solid manner on a region of the substrate), no tint refers to 0% coverage (i.e., no printing of the colorant on a region of the substrate), and half tint refers to 50% coverage (i.e., printing of the colorant on a region of the substrate in a manner that covers 50% of such region, such as by a 50% checkerboard pattern). In this case, the estimation of the resulting color value of the colorant deposited on the substrate is additionally based at least upon tint information describing an amount of tint of the colorant. According to an embodiment of the present invention, tint (or density) adjustment information describing a change in tint of the colorant from that considered as part of the estimation is utilized to modify the estimation based at least upon such tint adjustment information.

According to an embodiment of the present invention pertaining to a single colorant deposited on a substrate (without mixing), the estimation of the resulting color value of the colorant deposited on the substrate is based upon all of the above factors. According to other embodiments of the invention, however, consideration of subsets of these factors are utilized in the estimation.

According to one embodiment of the present invention, a non-continuous version of Bier's law in three dimensions pertaining to the red, green, and blue areas of the visible spectrum can be used as part of the estimation of the resulting color value of the colorant when deposited on a substrate.

Further in regard to a single colorant deposited on a substrate, according to an embodiment of the present invention, measurement information describing a color measurement of a deposition of the spot colorant is used to update the color value of the colorant to be reproduced, the smear information, or both, based at least upon the measurement information.

In the case of mixing or mixing colorants, according to an embodiment of the present invention, accurate estimations are obtained with one or more computers utilizing a physical model that accounts for trap and optionally opacity. According to an embodiment of the invention, the model may be based at least upon the Kubelka-Munk model. Additionally, the physical model, according to an embodiment of the invention, combines the imaging properties of primarily continuous tone systems, such as the Kubelka-Munk model, with the properties of primarily halftone systems, such as the Neugebauer model. According to an embodiment of the present invention, this model describes systems that are approximately 50%-70% continuous tone-like and 30%-50% halftone-like, such as ink jet and gravure systems, as well as systems that are only 10%-20% continuous tone-like and 80%-90% halftone-like such as offset printing systems.

In this regard, according to an embodiment of the present invention, computer-based systems and computer-implemented methods estimate a resulting color value of a plurality of colorants when mixed on a substrate. According to an embodiment of the present invention, the estimation of the resulting color value is based at least upon trap information, color information, and laydown sequence information. The trap information, according to an embodiment of the present invention, describes trap characteristics, such as an adhesiveness, associated with each of the plurality of colorants. According to an embodiment of the present invention, the estimating of the resulting color value includes calculating and utilizing a trap parameter describing a least amount of adhesiveness exhibited by the plurality of colorants. The color information, according to an embodiment of the present invention, describes at least a color value for each of the plurality of colorants and a color value of the substrate. The color values may be device-dependent color values or device-independent color values, such as CIELAB color values. In this regard, the estimated resulting color value may be in device-dependent or device-independent form. The laydown sequence information, according to an embodiment of the present invention, describes a mixing sequence of the plurality of colorants. The plurality of colorants, according to an embodiment of the present invention, may include cyan, magenta, yellow, and black colorants, and may also include one or more spot colorants.

Also in the case of mixing colorants, according to an embodiment of the present invention, the estimation of the resulting color value additionally is based at least upon opacity information describing opacity characteristics associated with each of the plurality of colorants. According to an embodiment of the present invention, the opacity information describes an amount of light that passes through each of the plurality of colorants.

Further in the case of mixing colorants, according to an embodiment of the present invention, tint of the colorants when deposited on the substrate may additionally be considered. In this regard, the estimation of the resulting color value is additionally based at least upon tint information describing an amount of tint of at least one of the colorants. According to an embodiment of the present invention, tint (or density) adjustment information describing a change in tint of at least one of the colorants from that considered as part of the estimation is utilized to modify the estimation based at least upon such tint adjustment information.

According to an embodiment of the present invention pertaining to mixing colorants on a substrate, the estimation of the resulting color value of a plurality of colorants when mixed on a substrate of the colorant deposited on the substrate is based upon all of the above factors. According to other embodiments of the invention, however, consideration of subsets of these factors are utilized in the estimation.

According to an embodiment of the present invention a Kubelka-Munk model, can be used as part of the estimation of the resulting color value of the colorants when mixed on a substrate.

Further in regard to mixing colorants on a substrate, according to an embodiment of the present invention, measurement information describing a color measurement of a mixing of the plurality of colorants is used to update (a) the color value for one or more of the plurality of colorants, (b) the trap information, (c) the opacity information, or combinations of (a), (b), and (c), based at least upon the measurement information.

In addition to the embodiments described above, further embodiments will become apparent by reference to the drawings and by study of the following detailed description.

BRIEF DESCRIPTION OF THE DRAWINGS

The present invention will be more readily understood from the detailed description of exemplary embodiments presented below considered in conjunction with the attached drawings, of which.

Figure 1:
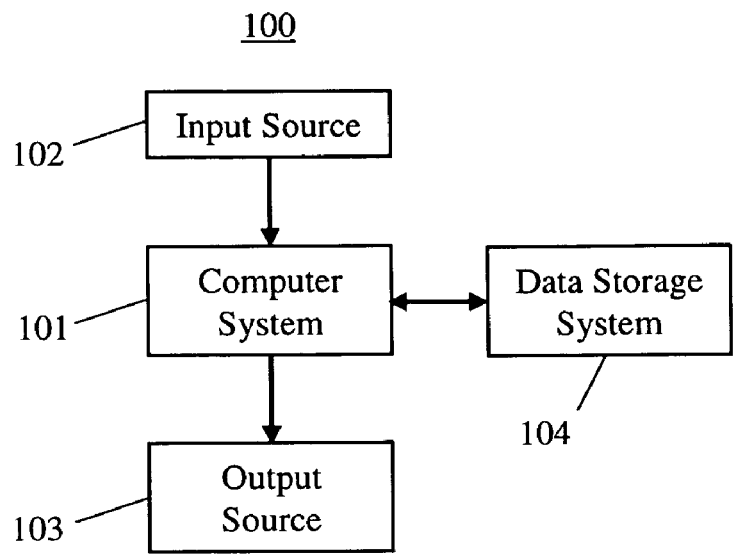
FIG. 1 illustrates a computer-based system for executing the processes described herein, according to an embodiment of the present invention.

It is to be understood that the attached drawings are for purposes of illustrating the concepts of the invention and may not be to scale.

DETAILED DESCRIPTION

This invention relates to estimating a resulting calorimetric value of an N-color printing system. Such systems often are comprised of four process colors: cyan, magenta, yellow, and black ("CMYK"), plus (N−4) specialty inks commonly known as spot colors. According to embodiments of the present invention, the estimations are based upon color information, such as original color measurement values of the N colorants and the substrate on which the N colorants are to be printed. Estimations for the resulting calorimetric values may be made as a function of changes in substrate measurement data and in the relative densities of the colorants for solid colorants, printed both individually and as overprints. Estimations also may be made as a function of both solid and non-solid input device values, also known as tint values. According to embodiments of the present invention, these estimations may be based at least upon one or more of: trap information, such as an estimated function for trap efficiency; opacity information, such as an estimated function for opacity; dot growth information, such as an estimated function for dot growth; smear information, such as an estimated function for dot smear; and, in the case of mixed (e.g., overprinted) colors, laydown sequence.

In the case of N-colorant systems that frequently alter the selection of spot colors, accurate estimations may be made based on individual colorant information that is not dependent on other colorants or a specific set of N colorants. In the case of a fixed set of N colorants, even greater accuracy may be achieved by adding a correction to account for each intercolorant interaction. The above estimative accuracy may be achieved, according to embodiments of the present invention, by modifying the Kubelka-Munk equations to account for both trap and opacity, and by combining the Kubelka-Munk equations with Neugebauer-based equations to form a hybrid imaging model. This hybrid imaging model accounts for most of the halftone and continuous tone properties of an imaging system, and can be modified for use with ink jet and gravure systems, as well as for nearly perfect halftone imaging systems such as halftone proofing systems and high quality offset printing presses.

An advantage of the present invention is that it is able to achieve both high accuracy of characterization as well as accurate profiling by performing fast, floating point calculations by utilizing an accurate mathematical model of the N-color printing system rather than by relying on multidimensional grids. Since the mathematical model is based on the actual physics of the printing system, a minimal number of parameters and characterization information is used to perform estimations of $L^*a^*b^*$ or spectra for a given set of N-color input color values. This in turn enables the construction of accurate physical models based on a minimal number of measurements, which means the data of existing sparsely sampled color charts is adequate for constructing an accurate estimative model for the printing system.

Another advantage of the present invention is that it accounts for trap when estimating a resulting appearance of mixed colors. Trap is typically characterized as a percentage or fraction between 0%-100%. Trap indicates how much (relative to printing on a substrate) a colorant sticks to an underlying colorant that has been previously printed. Thus, a trap of 66% for colorant A printing on colorant B implies that if the original density thickness for colorant A is 1.5 printing on a substrate, the density will be reduced to 1.0 when printing on B. Thus, even if one prints a colorant on black ink or a black substrate, there is no guarantee that the ink thickness is the same as that of printing on a substrate.

Various embodiments of the present invention, described herein, involve inventive data processing techniques that may be executed by a computer system 101, shown, for example, in FIG. 1. The computer system 101 may include one or more computers communicatively connected. The data required to execute the below-described data processing techniques may be provided to the computer from an input source 102 communicatively connected to the computer system 101. Although one skilled in the art will appreciate that the invention is not limited to any particular input source 102, such input source may include one or more user-interfaces, such as keyboards, mice, etc., other computers, or computer accessible memories that may have data stored therein or thereon.

To facilitate executing the data processing techniques described herein, the computer system 101 may have a data storage system 104 communicatively connected to it. The data storage system 104 may include one or more computer accessible memories. The output(s) generated by the computer system 101 as a result of executing the data processing techniques described below may be transmitted to an output source 103 communicatively connected to the computer system 101. Although one skilled in the art will appreciate that the invention is not limited to any particular output source 103, such output source 103 may include one or more display devices, other computers, or computer accessible memories that may have data stored therein or thereon.

The data-storage system 104 may be a distributed data-storage system including multiple computer-accessible memories communicatively connected via a plurality of computers and/or devices. On the other hand, the data storage system 104 need not be a distributed data-storage system and, consequently, may include one or more computer-accessible memories located within a single computer or device.

The phrase "computer-accessible memory" is intended to include any computer-accessible data storage device, whether volatile or nonvolatile, electronic, magnetic, optical, or otherwise, including but not limited to, floppy disks, hard disks, Compact Discs, DVDs, flash memories, ROMs, and RAMs.

The phrase "computer-accessible memory system" is intended to include one or more computer-accessible memories communicatively connected.

The term "computer" is intended to include any data processing device, such as a desktop computer, a laptop computer, a mainframe computer, a personal digital assistant, a Blackberry, and/or any other device for processing data, and/or managing data, and/or handling data, whether implemented with electrical and/or magnetic and/or optical and/or biological components, and/or otherwise.

The phrase "communicatively connected" is intended to include any type of connection, whether wired, wireless, or both, between devices, and/or computers, and/or programs in which data may be communicated. Further, the phrase "communicatively connected" is intended to include a connection between devices and/or programs within a single computer, a connection between devices and/or programs located in different computers, and a connection between devices not located in computers at all. In this regard, although the data storage system 104 is shown separately from the computer system 101, one skilled in the art will appreciate that the data storage system 104 may be stored completely or partially within the computer system 101.

The data processing techniques, according to various embodiments of the present invention, will now be described.

I. Estimating a Resulting Color Value of a Colorant When Deposited on a Substrate:

Several embodiments of the present invention include accurately estimating the color value of a colorant, which may or may not be a spot colorant, when printed on a substrate. In particular, these embodiments of the invention involve estimating the resulting color value based at least upon color information, smear information, and, optionally, dot size increase information and/or tint information. The color information describes a color value of the colorant and a color value of the substrate. The color values may be device-dependent color values or device-independent color values, such as CIELAB color values. In this regard, the estimated resulting color value may be in device-dependent or device-independent form. The smear information, according to an embodiment of the present invention, describes smear characteristics associated with the colorant, such as an amount of spreading of a printed dot of the colorant. The dot size increase information, according to an embodiment of the present invention, is associated with the colorant and describes an amount of growth of a printed dot of the colorant. The tint information, according to an embodiment of the present invention, describes an amount of tint of the colorant. Optionally, the value of the substrate can be modified to match the substrate of a particular print condition being simulated or profiled, and the relative density of the colorant can be adjusted.

According to an embodiment of the present invention, the estimating of the resulting color value includes utilizing a simplified version of the Kubelka-Munk equation (equation 4, above), in which scattering is assumed to approach zero. This assumption implies that, for a first order approximation, the colorants only absorb light, meaning that they are perfectly transparent (i.e. not opaque). This assumption also implies that the ratio of absorption to scattering $k(\lambda)/s(\lambda)$ is nearly infinite, resulting in the following expression (also known as Bier's Law):

$$R(\lambda,z) = R_g(\lambda)e^{-k(\lambda)z} \qquad \text{Eq. 6}$$

Equation 6, above, is a continuous function based on an infinite set of possible values of $\lambda$. In other words, calculation of the function $R(\lambda)$ requires full spectral information. Since the ICC-based standards used in the graphic arts are generally based on CIE systems that are inherently based on red, green, blue (or $\rho$, $\beta$, $\gamma$ in CIE cone response terminology), the single continuous function of $\lambda$, $R(\lambda)$ can optionally be replaced with a function of three dimensions that estimates reflection for the red, green, and blue areas of the visible spectrum:

$$R_j(z) = R_{gj}e^{-kjz} \qquad \text{Eq. 7}$$

where j=0, 1, 2 denotes red, green, and blue portions of the spectrum. This 3D reflectance vector can be denoted as $\vec{R}(\lambda)$, and can be computed without full spectral information. However, it should be noted that all calculations described herein in which references are made to RGB reflectance are equally applicable if instead one prefers to utilize a full spectrum of information measured for the colorants being modeled. In particular, the three values of j, above, can be regarded as representing three broad samplings of the visible spectrum. Alternatively, the above vector (Eq. 7) can represent a plurality of, such as thirty-two or more, narrow samplings of the spectrum. Intermediate granularity of samplings can be used to trade-off speed and accuracy. The resulting samplings can be directly converted to XYZ using the CIE observer functions. An advantage of using three broad samples of the spectrum is the speed of performing 3 calculations for the RGB portions of the spectrum rather than 32 calculations for the whole spectrum and the direct correlation of 3 channel calculations to the tristimulous approach used in ICC profiles. However, it is to be understood that the invention is not limited to the three-vector approach, the thirty-two or more vector approach, or any particular N-vector approach.

The RGB reflectance values above can be directly computed from the measured XYZ values of a substrate, colorant+substrate, etc. via matrix conversion. Note that for purposes of evaluating color data and for comparing the results of this invention with actual measured results, commonly used uniform device independent color metrics such as CIELAB will preferably be used. Measured values of CIELAB (L*a*b*) can be converted to and from CIEXYZ using the well-known equations for XYZ->L*a*b* and L*a*b*->XYZ. Assuming measurement CIELAB data has already been converted to XYZ, conversions to and from RGB may be performed via matrices that are well-known in the art:

$$\begin{pmatrix} X \\ Y \\ Z \end{pmatrix} = M \begin{pmatrix} R \\ G \\ B \end{pmatrix} \qquad \text{Eq. 8}$$

-continued $$\begin{pmatrix} R \\ G \\ B \end{pmatrix} = M^{-1} \begin{pmatrix} X \\ Y \\ Z \end{pmatrix} \quad \text{Eq. 9}$$

$$M = \begin{pmatrix} X_r & X_g & X_b \\ Y_r & Y_g & Y_b \\ Z_r & Z_g & Z_b \end{pmatrix} \quad \text{Eq. 10}$$

If a set of RGB values ($R_{0j}$) is given for a particular spot colorant and values ($R_{gj}$) are given for the substrate upon which the particular spot colorant is printed, the impact of smearing or reduction of ink film thickness by amount $\delta$ may be estimated as follows:

$$\begin{aligned} R_j(z_0(1-\delta)) &= R_j(\delta) \\ &= R_{gj} e^{-k_j z_0 (1-\delta)} \\ &= R_{gj} (e^{-k_j z_0})^{(1-\delta)} \\ &= R_{gj} \left[ \frac{R_j(z_0)}{R_{gj}} \right]^{(1-\delta)} \\ &= R_{gj} \left[ \frac{R_{0j}}{R_{gj}} \right]^{(1-\delta)} \end{aligned} \quad \text{Eq. 11}$$

Likewise, if there is a corresponding staining of the substrate in the adjacent holes of the halftone screen as a result of the smearing of ink from the dot, resulting in a Dmin thickness $\delta$ of the colorant upon the substrate, the resulting RGB values of the substrate ($R_{gj}'$) are:

$$\begin{aligned} R_{gj}'(\delta) &= R_{gj} e^{-k_j z_0 \delta} \\ &= R_{gj} (e^{-k_j z_0})^{\delta} \\ &= R_{gj} \left[ \frac{R_j(z_0)}{R_{gj}} \right]^{\delta} \\ &= R_{gj} \left[ \frac{R_{0j}}{R_{gj}} \right]^{\delta} \end{aligned} \quad \text{Eq. 12}$$

where, as before, j denotes the red, green, or blue part of the visible spectrum. If the RGB values for printing on white coated paper stock are extracted from a generic database, and if the actual print condition for CMYK is on a different colored substrate with RGB values $R_{g'j}$, the new values of RGB for the reduced spot colorant and corresponding stained substrate holes adjacent to the dots are as follows:

$$R_j(\delta) = R_{g'j} \left[ \frac{R_{0j}}{R_{gj}} \right]^{(1-\delta)} \text{ and} \quad \text{Eq. 13}$$

$$R_{g'j}(\delta) = R_{g'j} \left[ \frac{R_{0j}}{R_{gj}} \right]^{\delta} \quad \text{Eq. 14}$$

The estimated value of RGB for a tinted spot colorant of tint value x (i.e., the RGB vector function $\vec{R}(x,\delta)$) may be derived from $\vec{R}(\delta)$ and $\vec{R_g}(\delta)$ above using standard Neugebauer as follows:

$$\vec{R}(x, \delta, \Delta_g) = \vec{R}(\delta) g(x, \Delta_g) + \vec{R_{g'}}(\delta)(1 - g(x, \Delta_g)) \quad \text{Eq. 15}$$

where $g(x, \Delta_g)$ is a dot size function (tint value x plus dot gain):

$$g(x, \Delta_g) = x + 4\Delta_g x(1-x) \quad \text{Eq. 16}$$

and $\Delta_g$ is the estimated value of dot gain.

Before comparing this model with measured data, a reasonable estimate for how the smearing parameter $\delta$ varies with dot size $g(x,\Delta_g)$ is proposed using simple boundary considerations. By definition, at maximum dot value $g(x,\Delta_g) \rightarrow 1.0$ there is no smearing, since this is where the spot colorant is measured. Hence, $\delta(x) = \delta(1.0) = 0$. At small tint values $g(x, \Delta_g) \rightarrow 0$, the dots are clearly visible, albeit with an ink film thickness reduced by maximum amount $\delta_0$. Hence, if a linear reduction ranging from $0 \rightarrow \delta_0$ as $g(x,\Delta_g)$ varies from $1.0 \rightarrow 0$ is assumed as a first order approximation, $\delta(x)$ is:

$$\delta(x, \Delta_g) = \delta_0(1 - g(x, \Delta_g)) \quad \text{Eq. 17}$$

In the same way, the expression for $\delta(x)$ is estimated for the degree of staining by the colorant upon the adjacent substrate holes will be maximum for small substrate holes surrounded by lots of ink ($\delta(x) \rightarrow \delta_0$ as $g(x,\Delta_g) \rightarrow 1.0$). It is also estimated that the degree of staining by the colorant will be fairly small for white paper substrates surrounding small colorant dots since there is little ink available to smear ink ($\delta(x) \rightarrow 0$ as $g(x,\Delta_g) \rightarrow 0$):

$$\delta(x, \Delta_g) = \delta_0 g(x, \Delta_g) \quad \text{Eq. 18}$$

Therefore, an expression for estimating the RGB values for a tinted spot colorant, according to an embodiment of the present invention is as follows:

$$\vec{R}(x, \delta_0, \Delta_g) = \vec{R_{g'}} \left[ \frac{\vec{R_0}}{\vec{R_g}} \right]^{(1-\delta_0(1-g(x,\Delta_g)))} g(x, \Delta_g) + \vec{R_{g'}} \left[ \frac{\vec{R_0}}{\vec{R_g}} \right]^{\delta_0 g(x,\Delta_g)} (1 - g(x, \Delta_g)) \quad \text{Eq. 19}$$

where the notation $R_0/R_g$ is used to indicate dividing each vector component $R_{0i}$ by vector component $R_{gi}$ where i=0,1,2 indicates R, G, and B.

Finally, adjustments to density $\Delta D$ can be reflected in the above equations by including the relative density change $\Delta D/D_0$ where $\Delta D$ is the change in density and $D_0$ is the original density of the colorant:

$$\vec{R}(x, \delta_0, \Delta_g, \Delta D) = \vec{R_{g'}} \left[ \frac{\vec{R_0}}{\vec{R_g}} \right]^{(1-\delta_0(1-g(x,\Delta_g)))(1+\Delta D/D_0)} g(x, \Delta_g) + \vec{R_{g'}} \left[ \frac{\vec{R_0}}{\vec{R_g}} \right]^{\delta_0 g(x,\Delta_g)(1+\Delta D/D_0)} (1 - g(x, \Delta_g)) \quad \text{Eq. 20}$$

Thus, information that is used for estimating single colorants, which may be spot colorants, are the original RGB values for the colorant and the substrate (derived from measurement as explained below), the dot smear 60 and the dot gain (or dot growth) value $\Delta_g$. Accordingly, an embodiment of the invention estimates a resulting color value of a colorant deposited on a substrate based at least upon color information, smear information, and dot size increase information. According to this embodiment, the color information includes the original RGB values for the colorant and the original RGB values for the substrate. Also according to the embodiment, the smear information includes the dot smear $\delta_0$, and the dot size increase information includes the dot gain (or dot growth) factor $\Delta_g$. Tint information may also be considered as part of the estimation, which may be represented by $g(x,\Delta_g)$, according to an embodiment of the present invention. Optionally, different substrate RGB values can be included as well as changes to density of the colorants.

Figure 2:
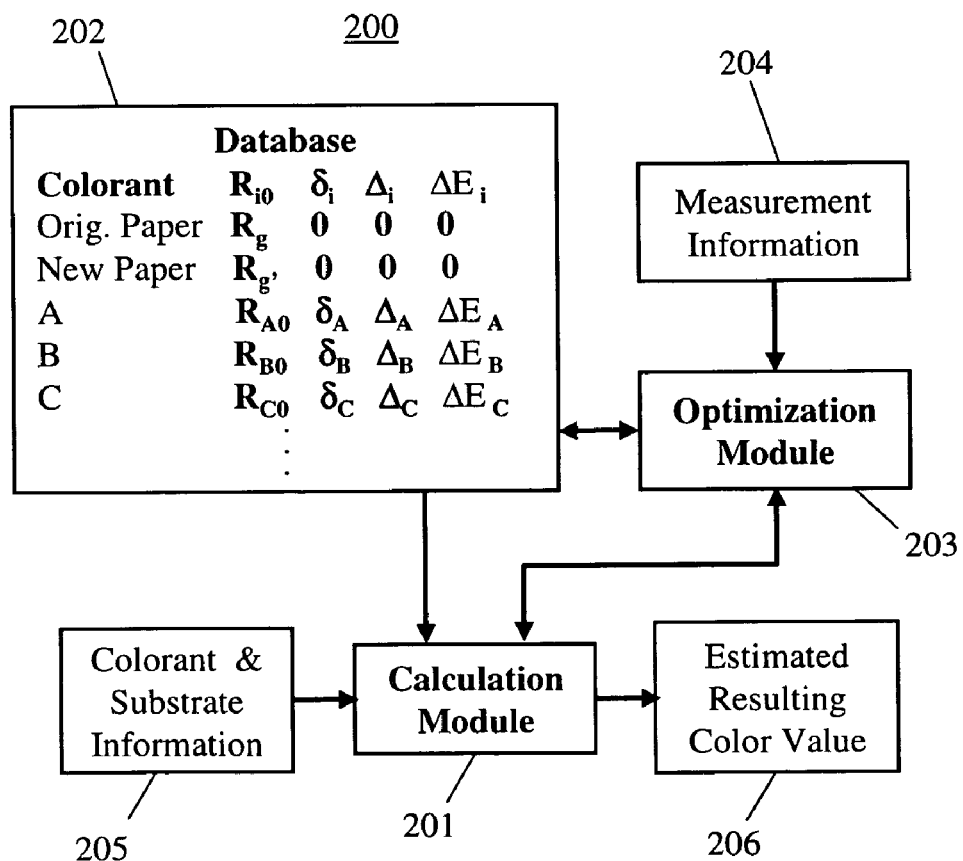
FIG. 2 illustrates a computer-based system for executing a method for estimating a resulting color value of a colorant when deposited on a substrate, according to an embodiment of the present invention.

FIG. 2 illustrates, according to an embodiment of the invention, a computer-based system 200 that executes equation 20, above, to estimate the color value of a colorant, which may or may not be a spot colorant, when printed on a substrate. In particular, FIG. 2 illustrates a database 202 that may have stored therein initial information for a plurality of colorants that may be printed on a substrate. The database 202 may be included in the data storage system 104 in FIG. 1. Initial information for various substrates may also be stored in the database 202. The initial information may include color information for each of the colorants and the substrate(s). The color information may include color values, such as values of reflectance $R_0=(R,G,B)$ for each of the colorants and the substrate(s). The initial information also may include smear information, such as the dot smear factor $\delta$; and dot growth information, such as the dot growth factor $\Delta_g$. Tint information may also be stored in the initial information in the database 202 for each of the colorants. The initial information may be received from the input source 102.

The values of $R_0=(R,G,B)$ may be computed directly from reflectance XYZ measurements of the substrate and each of the colorants converted to RGB via the XYZ->RGB matrix described in equation 9 above. The initial values of the factors $\delta$ and $\Delta_g$ can be based on an average of many colorants previously calculated, or, in the case of spot colorants, based on computed parameters for CMYK, where the initial estimate is based on the CMYK colorant most similar to the spot colorant being initialized. One could use an average value of the relevant CMYK parameters. Alternatively, relevant parameters could be measured once using a small set of basis inks (a set of size generally less than 15 or 20) and the estimates generated by relative weighting of these parameters in proportion to the percentage of each basis ink used to generate the other colorants.

The calculation module 201 receives information stored in the database 202, such as the color information, the smear information, and optionally the tint information and/or the dot size increase information for a particular colorant 205 to be deposited on a substrate. The calculation module 201 also receives the color information for the substrate being used from the database 202. Based at least upon the information received from the database 202, the calculation module estimates a resulting color value 206 of the colorant when deposited on the substrate.

With the database 202 above, as well as the more complex databases described in Sections II and III below, a basic assumption can be made. The basic assumption is that there exists a generic set of L*a*b* and/or spectral measurement values for solid spot colorants printed on a particular substrate (for example a Pantone set of spot colorants). It is also assumed that there exists characterization data and/or an ICC profile that describes the printing systems when printing CMYK colorants. If these two assumptions are correct, then the extensive data or characterization pertaining to the CMYK printing characteristics can be used to generate an initial estimate for the properties of each of the spot colorants, in this one embodiment of the invention, the values of $\delta$ and $\Delta$ for each colorant.

Optimization module 203, which also may be a part of the computer system 101 in FIG. 1, compares measurement information 204 describing a color measurement of a deposition of the colorant on the substrate to the estimated resulting color value 206. The measurement information 204 may be received by the optimization module 203 from the input source 102 shown in FIG. 1. The optimization module 203 then updates the color information, such as the values of $R_0=(R,G,B)$ for the colorant and the substrate; the smear information, such as the factor $\delta$ for the colorant; and optionally the dot size increase factor $\Delta$ for the colorant based at least upon the measurement information 204. For example, optimization module 203 may utilize a least squares fit to determine improved values of $\delta$ and $\Delta$ in order to reduce or minimize the error between estimation 206 and measurement 204. Database 202 may be updated as more accurate values of the colorant/substrate parameters are calculated. As the database 202 is updated and improved, the estimations for RGB and therefore XYZ as a function of tint input value for the corresponding spot colorants will improve as well. According to this embodiment, error information describing an error between the estimated resulting color value 206 and a measured color value from measurement information 204, reports an error of a same or substantially a same magnitude as expected error due to noise in measurement data from the measurement information 204. (Note that the RGB value of the original substrate and of the new substrate for the particular printing system are designated as the RGB vectors $R_g$ and $R_g$, to correspond to the vectors indicated in equation 20 above.)

The database 202 above, as well as the more complex subsequent databases described in Sections II and III below, may be used to keep track of factor/parameter status. If the current estimates of characteristics for a particular colorant is based on no direct measurement of that colorant, the database may indicate so to the user. This indicator can either be in the form of an expected error (for example 5 or 10 $\Delta E$) or in the form of a warning flag, etc. If the characteristics for a colorant are based on actual historical measurement (in the case of the above database, measurements of for example tint values for the spot colorant on the actual substrate used for the print process) then the expected error can be much lower. In the case of estimations for individual solid and tinted colorants, this would be approximately 1 $\Delta E$. As the estimations become more complex, such as mixed colorants or mixed spot colorants that are both solids and tints (described in later sections), the expected error for estimation will be higher than that of the simple case of individual spot colorants, but much lower than attempting to make estimations without the use of the physical mathematical models in this invention. In the unique case where the database identifies that groups or sub-groups of spot colorant inks have been printed before and measured, the models described in this disclosure can be empirically corrected to achieve the greatest accuracy for use in the job, typically very close to the noise of the measurement data itself, i.e. typically 1 $\Delta E$. This estimated $\Delta E$ error can be a specific field in the database for each spot colorant. Other embodiments could be to assign a $\pm$/− value of uncertainty to each of the parameters for a spot colorant.

With regards to the matrix used to convert between XYZ and RGB (equations 8 and 9), any reasonable RGB working space can be used that contains the gamut of colorants: for CMYK inks, for example, AdobeRGB with white point set to D50 illumination can be used. The matrix and inverse matrix for AdobeRGB at D50 (a.k.a. SMPTE_240_D50) are:

$$M = \begin{pmatrix} .6454 & .181 & .1378 \\ .3328 & .6121 & .0551 \\ .0303 & .0690 & .7257 \end{pmatrix} \quad \text{Eq. 21}$$

$$M^{-1} = \begin{pmatrix} 1.8243 & -0.5049 & -.3080 \\ -0.9934 & 1.9227 & 0.0426 \\ 0.0184 & -0.1617 & 1.387 \end{pmatrix}$$

Note that a simpler although less accurate option is to use no matrix at all to convert from XYZ->RGB and RGB->XYZ which is equivalent to using an identity matrix for M. The manner in which colorants are modified due to density adjustment will be slightly less accurate but may be adequate for certain proofing applications.

Results and Analysis:

A study demonstrating the above calculations, using equations 8, 9, and 20, was performed where a single value of dot smearing/staining $\delta_0 = 0.09$ for the CMYK channels was manually determined to obtain a good (i.e. 1 delta E) alignment of plots of measured vs. estimated L*a*b* for the individual CMYK channels of the SWOPTR001 data (available through www.SWOP.org). This value of smearing/staining combined with the following values of dot gain or dot growth "$\Delta$" resulted in an average total error of 1.1 delta E and a maximum error of 2.5 delta E between data and estimation:

$\Delta_C = 0.137$ $\Delta_M = 0.107$ $\Delta_Y = 0.087$ $\Delta_K = 0.157$ \quad Eq. 22

Note that these values are lower than the dot gain measured with a densitometer (typically 20%), because the measured dot gain is now a combination of increased dot size and increased dot smearing and staining. The staining of the holes in particular has a significant impact on the measured dot gain, since this is equivalent to a halo surrounding the colorant dot.

In order to get a better correlation between typical measured dot gain as measured with a densitometer by the user and the dot gain defined above, a new parameter "total dot gain" can defined that combines both increase to dot size ($\Delta$) and increased effective dot size due to smearing ($\delta_0$):

$\Delta_{tg} = \Delta_g + 0.7\delta_0$ $\Delta_g = \Delta_{tg} - 0.7\delta_0$ \quad Eq. 23

Equation 23 results in values displayed to the user of dot gain D that are similar to values expected by the user:

$\Delta_{tC} = 0.20$ $\Delta_{tM} = 0.17$ $\Delta_{tY} = 0.15$ $\Delta_{tK} = 0.22$ \quad Eq. 24

II. Estimating a Resulting Color Value of a Plurality of Colorants when Solidly Printed and Mixed on a Substrate Several embodiments of the present invention include accurately estimating the resulting color value of a plurality of colorants when solidly printed and mixed on a substrate. (The mixing of any arbitrary tint values $x_k$ for colorants k=0, . . . , n-1, with high accuracy is described in section III below.) In particular, these embodiments of the invention involve estimating the resulting color value based at least upon color information, laydown sequence information, trap information, and, optionally, opacity information. The color information, according to an embodiment of the present invention, describes at least a color value for each of the plurality of colorants and a color value of the substrate. The color values may be device-dependent color values or device-independent color values, such as CIELAB color values. In this regard, the estimated resulting color value may be in device-dependent or device-independent form. The laydown sequence information, according to an embodiment of the present invention, describes a mixing sequence of the plurality of colorants. The trap information, according to an embodiment of the present invention, describes trap characteristics, such as an adhesiveness, associated with each of the plurality of colorants. According to an embodiment of the present invention, the estimating of the resulting color value includes calculating and utilizing a trap parameter describing a least amount of adhesiveness exhibited by the plurality of colorants. According to an embodiment of the present invention, the opacity information describes opacity characteristics associated with each of the plurality of colorants. According to an embodiment of the present invention, the opacity information describes an amount of light that passes through each of the plurality of colorants. The plurality of colorants, according to an embodiment of the present invention, may include cyan, magenta, yellow, and black colorants, and may also include one or more spot colorants.

According to an embodiment of the present invention, if solidly printed colorants, which may be spot colorants, from a generic database are mixed, the resulting RGB estimation 206 using a different substrate of the current colorant target is:

$$R_j = R_{g'j} \prod_{k=0}^{k=n-1} \left[ \frac{R_{0jk}}{R_{gj}} \right] \quad \text{Eq. 25}$$

where k=0, . . . , n-1 denotes the colorant index for n colorants. Note that this expression is for all tint values=100%, where there is no tint mixing and no smearing. The approach described above in equation 25 either with or without matrix M can be used to estimate the Neugebauer reflectances in equation 1 in order to have an approximate mixing model for both solids and tints. If no matrix M is used, the reflectance values R=(R,G,B) reduce to becoming the original measured data R=(X,Y,Z). If the full spectral data are used, j=0,1, . . . , $n_s$–1 can be used where $n_s$ is the number of spectral samples (typically 32).

According to an embodiment of the present invention, the Kubelka-Munk equation (Eq. 4) is simplified. It can optionally be modified for use with broadly sampled spectral data, such as within a tristimulous non-spectral color management workflow like the ICC, known in the art. The dimensionality N=3 can be extended to N=32 or higher if the results of full spectral calculations are to be simulated. However, reasonable accuracy combined with rapid calculations can be obtained even with N=3. One skilled in the art will appreciate that the invention, however, is not limited to any particular values of N as long as N is 3 or greater.

In particular, consider estimates for reflectance, which are based on the red, green, and blue portion of the visible spectrum (j=0,1,2) for a thickness of ink z. An embodiment of the present invention defines a normalized value of z to be $z' = z/z_0$ where $z_0$ is the thickness of solid ink printing on the substrate.

This implies that z'=1.0 is the original thickness of a colorant on the substrate, z'=0.75 is 75% of the original thickness (for example, when printing on another ink with a value of trap equal to 75%), and z'=1.1 is 110% of the original thickness (for example, if the adhesive properties of a previously printed colorant layer are higher than the substrate resulting in a thicker layer of ink sticking to the surface for subsequent colorants). The expression for reflection may be rewritten as follows:

$$R_j(z') = \frac{(R_{j\infty} - R_{jg})e^{-(1/R_{j\infty} - R_{j\infty})s_j z_0 z'} - R_{j\infty}(1 - R_{jg}R_{j\infty})}{R_{j\infty}(R_{j\infty} - R_{jg})e^{-(1/R_{j\infty} - R_{j\infty})s_j z_0 z'} - (1 - R_{jg}R_{j\infty})} \quad \text{Eq. 26}$$

$$R_j(z') = \frac{(R_{j\infty} - R_{jg})e^{-\alpha_{j0} z'} - R_{j\infty}(1 - R_{jg}R_{j\infty})}{R_{j\infty}(R_{j\infty} - R_{jg})e^{-\alpha_{j0} z'} - (1 - R_{jg}R_{j\infty})}$$

where $\alpha_{j0}$ is defined to be:

$$\alpha_{j0} = (1/R_{j\infty} - R_{j\infty})s_j z_0 \quad \text{Eq. 27}$$

Solving for $\alpha_{j0}$ in terms of measurable quantity $R_j(z_0)$, $R_{jg}$ and estimates for $R_{j\infty}$ for z'=1:

$$\alpha_{j0} = -\ln\left[\frac{R_j(z_0)(1 - R_{jg}R_{j\infty}) - R_{j\infty}(1 - R_{jg}R_{j\infty})}{R_j(z_0)R_{j\infty}(R_{j\infty} - R_{jg}) - (R_{j\infty} - R_{jg})}\right] \quad \text{Eq. 28}$$

The above approach greatly simplifies the use of Kubelka-Munk. Rather than requiring complex direct measurements or calculations to determine $k(\lambda)$ and $s(\lambda)$, one only requires the easily available measurements defined above and an estimate for $R_{j\infty}$. For simplicity, $R_j(z_0)$ may be identified as a fixed measured input value $R_{j0}$:

$$\alpha_{j0} = -\ln\left[\frac{R_{j0}(1 - R_{jg}R_{j\infty}) - R_{j\infty}(1 - R_{jg}R_{j\infty})}{R_{j0}R_{j\infty}(R_{j\infty} - R_{jg}) - (R_{j\infty} - R_{jg})}\right] \quad \text{Eq. 29}$$

The reflection can now be estimated as a function of the trap efficiency $\beta_T$, which is a multiplicative factor for original ink film thickness $z_0$:

$$R_j(z', \beta_T) = \frac{(R_{j\infty} - R_{jg})e^{-\beta_T \alpha_{j0} z'} - R_{j\infty}(1 - R_{jg}R_{j\infty})}{R_{j\infty}(R_{j\infty} - R_{jg})e^{\beta_T \alpha_{j0} z'} - (1 - R_{jg}R_{j\infty})} \quad \text{Eq. 30}$$

where $\beta_T = 1.0$ for perfect trapping efficiency of the colorant upon the underlying base plus colorants.

Next a simple estimate for $R_{j\infty}$ may be performed. Note that $R_{j\infty}$ can be thought of as "$R_{jmin}$", i.e., the minimum reflectance (or maximum absorption) of an ink regardless of ink film thickness piled onto the substrate. A reasonable and intuitive initial guess for $R_{j\infty}$ is to assume that it has similar properties as the original measured values for the colorant but scaled by an opacity factor $\rho_\infty$. Hence:

$$R_{j\infty} = \rho_\infty R_{j0} \quad \text{Eq. 31}$$

$$R_j(z', \beta_T, \rho_\infty) = \frac{(\rho_\infty R_{j0} - R_{jg})e^{-\beta_T \alpha_{j0} z'} - \rho_\infty R_{j0}(1 - R_{jg}\rho_\infty R_{j0})}{\rho_\infty R_{j0}(\rho_\infty R_{j0} - R_{jg})e^{\beta_T \alpha_{j0} z'} - (1 - R_{jg}\rho_\infty R_{j0})} \quad \text{Eq. 32}$$

An advantage of this assumption is that in the example where the opacity factor $\rho_\infty = 0.999$, the estimated RGB values of opaque colorant "A" ($\rho_\infty = 0.999$) overprinting on the substrate plus colorant "B" will be equal to the RGB values of colorant "A" that were originally observed. In the other extreme where the opacity factor $\rho_\infty = 0.0001$, the expression for Kubelka-Munk reduces to Bier's law as indicated in equation 6 above. Optionally, the values of $R_{j\infty} = \rho_\infty R_j$ can be used as an initial estimate for $R_{j\infty}$ which can be improved via least squares fit in a similar manner to the following description for determining optimal values of trap, smear, dot gain, etc. Note that the values of alpha in equation 29 must be recalculated whenever new values of $R_{j\infty}$ are estimated.

In the event that this starting point estimate for opacity does not result in good agreement with data, the opacity characterization $\rho_\infty$ can be implemented as a function of $\lambda$ (if spectral data is used) or as a discrete vector of values of size n, where n, is the sample size of the spectra, either $n_s = 3$ in the case of the above RGB tristimulous approach up to (for example) $n_s = 32$ for discrete spectral data from typical spectrophotometers.

It may now be observed that the trap parameter $\beta_T$ is a characteristic of the surface upon which the colorant is printing, either the substrate or the substrate with preceding colorant layers printed upon the surface. By definition, if the colorant is printed upon the substrate, the value of the trap parameter of the substrate is normalized such that $\beta_T = 1.0$. Empirical evidence indicates that when a colorant is printed on multiple mixed colorants, the value of the trap parameter $\beta_T$ is given by the worst case trap efficiency of the underlying colorants. For example, when examining the SWOP TR001 data set, it appears that whereas the trap efficiency of CMY colorants is approximately 75%, the efficiency of K is about 45%. When three colorants are printed (CMY) together, the effective trap appears to remain approximately 75%. However, when either one, two, or three CMY colorants are printing on K, the effective trap appears consistently to be 45%—i.e. the "stickiness" or adhesion properties are dominated by the underlying K layer.

In summary, it has been determined that in many print conditions (such as SWOP printing as documented in the CIELAB data of the TR001 data set) the trap efficiency for mixed colorants which precede the colorant being printed is given by the lowest trap efficiency of the mixed colorants. Accordingly, a single trap value $\beta_T$ can be determined for the group of preceding colorants. This value is equal to the $\beta_T$ of the least efficient (lowest $\beta_T$) of the mixed colorants, and may be used to calculate the relative thickness of the next colorant printed. Note that this assumption can be modified such that the value of trap is determined by the characteristic trap value of the previously printed colorant layer rather than by the minimum of the group if this observation does not hold for all systems.

Next, the K-M expression above may be updated for multiple colorants N plus the substrate. The index "i" indicates the colorant number beginning with the substrate (i=0) and proceeding with the first layer of colorant (i=1) and so forth.

Thus, the index "i" ranges from i=0 to i=N:

$$R_{ij}(z', R_{(i-1)j}, \beta_T, \rho_{i\infty}) = \frac{(\rho_{i\infty} R_{ij0} - R_{(i-1)j})e^{-\beta T \alpha_{ij0} z'} - \rho_{i\infty} R_{ij0}(1 - R_{(i-1)j}\rho_{i\infty} R_{ij0})}{\rho_{i\infty} R_{ij0}(\rho_{i\infty} R_{ij0} - R_{(i-1)j})} \quad \text{Eq. 33}$$
$$e^{-\beta T \alpha_{ij0} z'} - (1 - R_{(i-1)j}\rho_{i\infty} R_{ij0})$$

where $$\beta_T = \min(\beta_{(i-1)T}, \beta_{(i-2)T}) \quad \text{Eq. 34}$$

and where the calculation for each vector $\alpha_i$ above is given by:

$$\alpha_{ij0} = -\ln\left[\frac{R_{ij0}(1 - R_{0j}\rho_{i\infty} R_{ij0}) - \rho_{i\infty} R_{ij0}(1 - R_{0j}\rho_{i\infty} R_{ij0})}{\rho_{i\infty} R_{ij0}^2(\rho_{i\infty} R_{ij0} - R_{0j}) - (\rho_{i\infty} R_{ij0} - R_{0j})}\right] \quad \text{Eq. 35}$$

The above expressions are for i>1. For i=1, i.e., the first layer of colorant laid down, $\beta_T = 1.0$ by definition, because trap is always defined to be the efficiency with which colorants adhere to one another relative to how well they adhere to the substrate. Note that in the generalized expression, i=0 is now associated with substrate rather than using the subscript "g". The vector $R_0$ refers to substrate reflectance values. The original values of $R_0$ are always used in equation 35 above. In the event of new substrate values defined by $R'_0$, the vector $R'_0$ is substituted for $R_0$ in equation 33 above. Note the convention as well that for each colorant, $R_i$ refers to the original solid spot reflectance, $R'_{iO}$ is the new reflectance of layer "i" as a function of previous layers and possibly new substrate.

Figure 3:
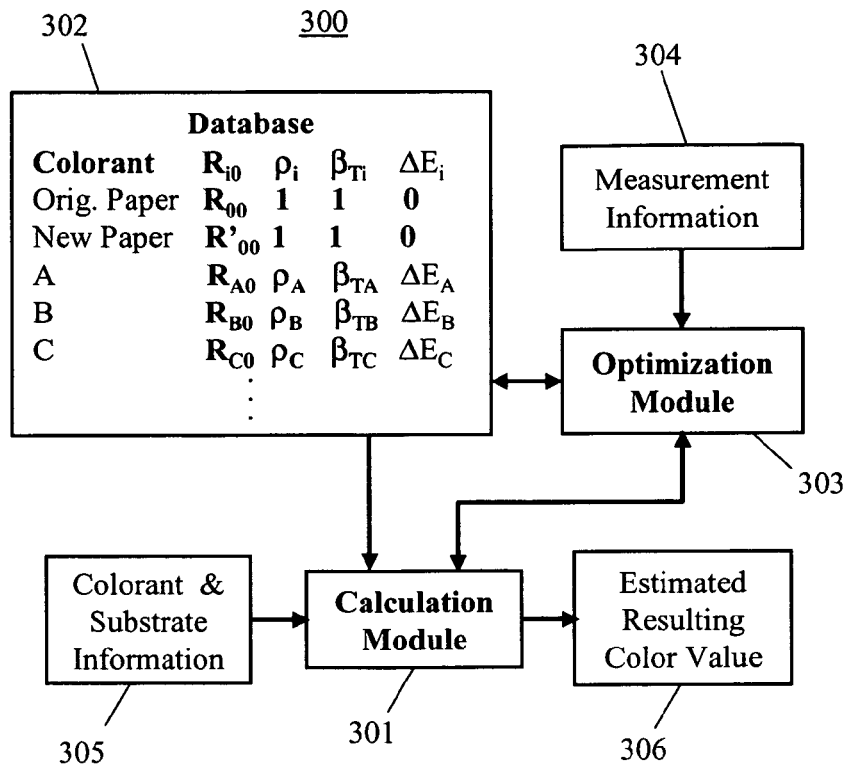
FIG. 3 illustrates a computer-based system for executing a method for estimating a resulting color value of a plurality of colorants when solidly printed and mixed on a substrate, according to an embodiment of the present invention.

The embodiment of FIG. 3 illustrates a computer-based system 300 that executes equations 33, 34, and 35, above, to estimate resulting color value of mixed colorants, spot or otherwise, when such mixed colorants are printed solidly on a substrate, i.e., have maximum or approximately maximum tint (this implies z=1 for all colorants that are printed together, z=0 for those colorants not printed). Effects associated with tinted (non-solid) colorants, such as dot size gain, dot smearing, and dot staining are described below in Section III.

In particular, the embodiment of FIG. 3 illustrates a database 302 that may have stored therein initial information for a plurality of colorants that may be printed on a substrate. The database 302 may be included in the data storage system 104 in FIG. 1. Initial information for various substrates may also be stored in the database 202. The initial information may include color information for each of the colorants and substrate(s). The color information may include color values, such as values of reflectance $R_0 = (R,G,B)$ for each of the colorants and the substrate(s). The initial information also may include trap information, such as the trap factor $\beta_T$, for each of the colorants; and opacity information, such as the opacity factor $\rho$, for each of the colorants. The initial information may be received from the input source 102.

The values of $R_0 = (R,G,B)$ may be computed directly from reflectance XYZ measurements of the substrate and each of the colorants converted to RGB via the XYZ->RGB matrix described in equation 9 above. The initial values of the factors $\beta_T$ and $\rho$ can be based on an average of many colorants previously calculated, or, in the case of spot colorants, based on computed parameters for CMYK, where the initial estimate is based on the CMYK colorant most similar to the spot colorant being initialized. One could use an average value of the relevant CMYK parameters. Alternatively, relevant parameters could be measured once using a small set of basis inks (a set of size generally less than 15 or 20) and the estimates generated by relative weighting of these parameters in proportion to the percentage of each basis ink used to generate the other colorants.

The calculation module 301 receives information stored in the database 302, such as the color information, the trap information, and optionally the opacity information particular to the set of colorants 305 to be mixed on a substrate. The calculation module 301 also receives the color information for the substrate being used from the database 302. Based at least upon the information received from the database 302, the calculation module estimates a resulting color value 306 of the colorants when mixed on the substrate.

Optimization module 303, which also may be a part of the computer system 101 in FIG. 1, compares measurement information 304 describing a color measurement of a mixing of the colorants on the substrate to the estimated resulting color value 206. The measurement information 304 may be received by the optimization module 303 from the input source 102 shown in FIG. 1. The optimization module 303 then updates the color information, such as the values of $R_0 = (R,G,B)$ for one or more of the colorants and the substrate; the trap information, such as the factor $\beta_T$ for one or more of the colorants; and optionally the opacity information, such as the factor $\rho$ for one or more of the colorants based at least upon the measurement information 204.

For example, optimization module 303 may utilize a least squares fit to determine improved values of $\beta_T$ and $\rho$ in order to reduce or minimize the error between estimation 306 and measurement 304. Database 302 may be updated as more accurate values of the colorants/substrate factors are calculated. As the database 302 is updated and improved, the estimations for RGB and therefore XYZ will improve as well.

Typically, if multiple example measurements are received by the optimization module, a good estimate of expected error can be made. For example, if data exists for colorant A printing on colorant B, and colorant C printing on colorant B, a reasonable estimate for the trap parameter can be determined for colorant B. Often, the trap estimate will result in an error between estimation and measurement between A printing on B and C printing on B. This error can be used as an estimate for the estimative accuracy of calculating L*a*b* with colorant B in a set of inks. In the event that a job actually contains the spot colorants A, B, and C, the actual historical overprint data can be used directly to ensure an accurate estimation of L*a*b* for that job. The data can be used by performing empirical corrections to the overprint results of the Kublka-Munk model using the estimated values of trap, opacity, etc. for A, B, and C. Note that the database keeps track of expected ΔE for each spot colorant. According to an embodiment, error information describing an error between the estimated resulting color value 306 and a measured color value from measurement information 304, reports an error of a same or substantially a same magnitude as expected error due to noise in measurement data from the measurement information 304.

As preferred values of trap information and, optionally, opacity information, such as the trap factor $\beta_T$ and the opacity factor $\rho$, respectively, are calculated for each colorant A, B, C, etc. based on actual measured data 304, new combinations of colorants A, B, C, etc., which were not included in the measurement data 304, can be estimated based on equations 33, 34, and 35 and on the updated values of R, trap $\beta_T$, and opacity $\rho$ for each colorant. For example, the optimization module 303 may use a first set of measurement data containing combinations of colorants A, B, C, and D to calculate R, trap $\beta_T$, and opacity $\rho$ for each of A, B, C, and D. The optimization module 303 may then calculate R, trap $\beta_T$, and opacity $\rho$ for a second data set containing colorants E, F, G, and H, updating database 302 each time. Having performed this initial optimization, calculation module 301 may then accurately estimate the values of R' (and subsequently XYZ and L*a*b*) of other combinations not previously measured such as A and E, or B and F, or A, D, E, and G, utilizing values of L*a*b*, trap $\beta_T$, and opacity $\rho$ for each colorant from database 302. By "combinations" is meant overprinting colorant A on colorant E, etc.

It should be noted that common practice in the industry is to define and measure "trap" for a pair of colorants by comparing the actual vs. expected density readings using red, green, and blue filters. The expected result of adding two colorants is the sum of the individual density readings. The actual result is generally lower than the sum of the individual readings. This characterization of "trap" is specific for that pair of colorants and is not incorporated into a estimative method for combining any pairs of colorants in any order. Likewise, "opacity" is indicated by comparing the expected vs. measured densities of a colorant printing on black-density values of non-opaque colorants printing on black will result in density measurements lower than the measured density of the black rather than higher.

By contrast to the above, an embodiment of the present invention determines, via least square fit, the values of trap and opacity defined explicitly in a closed form mathematical expression and is able to utilize conventional measurement chart data such as IT8.3/7, known in the art, to estimate these values. This embodiment is able to use all the overprint chart data and is not limited to colorants printed on black in order to estimate opacity. Likewise, this embodiment determines a general trap parameter for each colorant that applies to all combinations of that colorant with other colorants. The optimization module 301 may utilize all different combinations of colorants printed together to determine the optimal values of trap for each colorant. This approach is more effective than the typical procedure mentioned above of printing on black: when printing on black, it is difficult to separate the impact of opacity and the impact of trap. By performing a least squares analysis of all available overprint data, one can generally ascertain a highly reliable estimate for trap, opacity, or other significant properties of the colorants.

Figure 5:
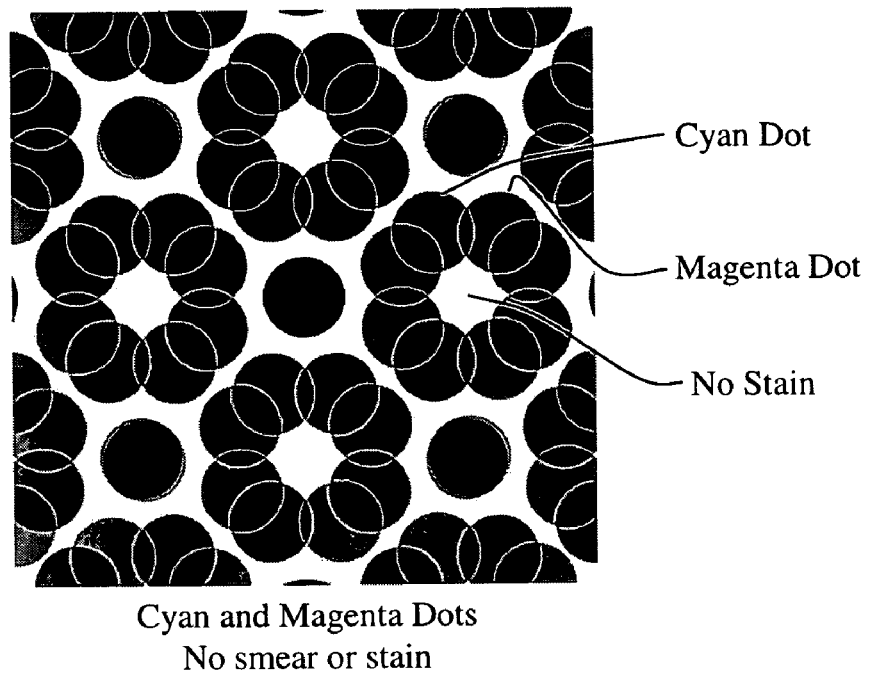
FIG. 5 illustrates printed dots not subject to smearing or staining effects.
Figure 6:
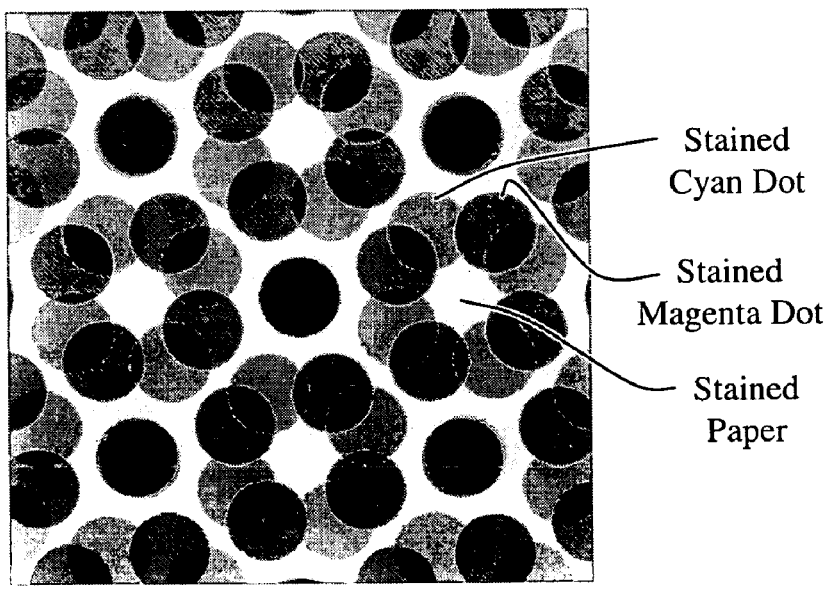
FIG. 6 illustrates printed dots subject to smearing and staining effects.

III. Estimating a Resulting Color Value of a Plurality of Colorants Mixed on a Substrate, Regardless of Whether the Colorants are Individually Printed in a Solid or a Tinted Manner According to these embodiments of the present invention, dot size increase and colorant smearing effects are incorporated into equation 33 to account for both solidly printed and non-solidly-printed ("tinted") colorants. Normally, the Neugebauer equations inherently assume that the Neugebauer primaries are independent of tint value for each of the colorants. Microdensitometry using RGB filters as well as visual assessment using a microscope clearly indicates two realities regarding real printing of dots on the substrate: the density of dots may be different than the density of the solids, the minimum density $D_{min}$ of the substrate surrounding dots may not be as low as the minimum density $D_{min}$ of the substrate with no dots (i.e. there can be a staining phenomenon occurring), and finally this staining affects not only the adjacent substrate region but also the adjacent dots of the other colorants. Thus, this implies that the Neugebauer primaries are functions of each dot value for each colorant. This staining can be simulated by creating large halftones with PhotoShop, converted to RGB, and then adjusted to simulate these two effects, as shown in FIGS. 5 and 6.

Now, changes in relative ink film thickness $\delta_i$ may be incorporated into the K-M reflection equation 33:

$$R_{ij}(z_i', R_{(i-1)j}, \beta_T, \rho_{i\infty}, \delta_i) = \frac{\rho_{i\infty}R_{ij0}(1 - R_{(i-1)j}\rho_{i\infty}R_{ij0})}{\rho_{i\infty}R_{ij0}(\rho_{i\infty}R_{ij0} - R_{(i-1)j})} \frac{(\rho_{i\infty}R_{ij0} - R_{(i-1)j})}{e^{\beta_T \alpha_{ij0}(z_i' + \delta_i)} - e^{-\beta_T \alpha_{ij0}(z_i' + \delta_i)} - (1 - R_{(i-1)j}\rho_{i\infty}R_{ij0})}$$

Eq. 36

The above reflection expression of equation 36 is referred to herein as the Neugebauer primary for colorant "i" printing on surface colorant "i−1", which in turn is calculated from colorant "i−2", etc. Note that for all the Neugebauer primaries, all the N ink colorants may be regarded as printing together with either thickness $z_i'=1$ or thickness $z_i'=0$ for each colorant "i". In the case where $z_i'=1$, the impact of the colorant is reduced by the effect of "dot smear" $\delta_i$. In the case where $z_i'=0$, the reflection expression above is impacted by "dot stain" $\delta_i$, i.e. the small ink film thickness staining the surrounding holes adjacent to the dots of colorant "i". In either case, it is assumed that the delta correction varies linearly with dot size. This means that the magnitude of stain $\delta_i$ increases with the quantity of ink surrounding the "hole" or non-ink area, and the magnitude of dot smear $\delta_i$ increases linearly as the dot size gets smaller.

This latter assumption above regarding the magnitude of dot smear increasing linearly as dot size decreases may be made because the probability of smearing is high when the relative area of dot is low, and the probability of smearing is low when relative area of dot is high. These relationships hold because there is more empty space to which the ink can migrate in the case of a small dot surrounded by the substrate. There is less empty space to which the ink can migrate when the ink is near 100% tint. Likewise, the impact of staining on the surrounding area is low if the dot is small because the reservoir of ink from which staining can occur is small. The impact of staining is high when there is a significant reservoir of ink surrounding the hole in the case of ink near 100%. Thus, a first order approximation is to allow staining and smearing to vary linearly with dot size, which appears to be an adequate starting point based on the results of fits of the mathematical model to measurement data. Other possible functions may include the ratio of dot area to circumference, which would vary as the square root of dot size. One skilled in the art, however, will appreciate that the invention is not limited to any particular approximation function for the phenomenon of staining/smearing, or more broadly for the continuous tone properties of a particular system.

Assuming a linear relationship of $\delta_i$ and dot size, the above expression for calculating the Neugebauer primaries can have two possible values of $z_i'$: $z_i'=1$ and $z_i'=0$. The correction $\delta_i$ to account for ink migration from the dots to the surrounding area likewise has two expressions, according to an embodiment of the present invention: one for dot smear when $z_i'=1$ and one for dot staining of the surrounding area when $z_i'=0$:

$$\delta_i = \delta_i(x, \Delta_i)$$

$$= -\delta_{i0}(1 - g(x, \Delta_i)) \quad \text{for } z_i' = 1 \text{ and}$$

$$= \delta_{i0}g(x, \Delta_i) \quad \text{for } z_i' = 0$$

Eq. 37

$g(x,\Delta_i)$ is the expression for dot size increase (similar to "dot gain"):

$$g(x,\Delta_i)=x+4\Delta_i x(1-x) \qquad \text{Eq. 38}$$

Note that in this model, the concept of "dot gain" is generalized to be any change in the physical dot size in relation to the original dot value x. Thus, the g(x) expression above is a simplified model assuming linear films or plates and assuming some spreading in dot area during printing. In the event of complex LUTs being deployed such that the films or plates are not linear, the $g(x,\Delta_i)$ function may be modified to account for these non-linearities. It should be noted that the term "dot size increase" is being used rather than "dot gain" because "dot gain" (as commonly measured via instrument) is a combination of dot size increase as well as dot smear. The fact that "dot gain" measures differently for the same dot using different RGB filters is a direct result of the impact of dot smear. If all "dot gains" were due to dot size increase, the values measured by RGB filters would always be the same.

Note that in the case of $\delta_i=0$ (no smear) for colorant "i" there is no impact from colorant "i" on the reflection expression when $z_i'=0$, thus $R_{ij}=R_{(i-1)j}$. Also note that since $\delta_i(x,\Delta_i)$ is a function of input dot value "x", the reflection for each Neugebauer primary is a function of input dot value "x" by virtue of the "dot smear" or "dot stain" correction $\delta_i(x,\Delta_i)$.

The above expression for R can be identified and calculated iteratively for an unlimited number of separations by defining the input parameter p for "permutation number". The permutations referred to are the possible combinations of solid colorants either printing or not printing in combination with each other, i.e. the permutations of Neugebauer primaries for N color separations. The number of permutations $N_p$ for number of separations $N_s$ ranging all the way from the no-colorant Neugebauer primary (substrate) to the all-colorant Neugebauer primary (solid N-color black for $N=N_s$) is given by:

$$N_p = 2^{N_s} = 1 + \sum_{i=0}^{i=N_s-1} 2^i \qquad \text{Eq. 39}$$

The formalism above is designed to show that a convenient way to uniquely identify each permutation p is via binary notation. The binary value "0000" (in the example of CMYK) would refer to each separation being "off" whereas the maximum binary value "1111" would identify the permutation where all separations are "on".

Thus, permutation number p ranges in value from 0 to $N_p-1$. However, since the Kubelka-Munk expressions begin with a "$0^{th}$" separation which is always "on", namely the substrate, the number of permutations should be increased accordingly by increasing the value of $N_s$ by 1. However, since the substrate (s=0) is always "on", the actual number of permutations is actually given by $2^{Ns}$ rather than $2^{(NS+1)}$. This apparent discrepancy is resolved by using the value of $2^{(NS+1)}$ as the number of permutations, by discarding the first permutation p=0 since this would imply substrate "off" which never occurs, and by always incrementing the value of p by 2 rather than 1 to ensure that the substrate separation always remains "on". Thus, the first permutation (again using CMYK as an example) would be "00001" implying all separations "off" and the largest value of p would be "11111" implying all separations "on". The permutations would increment according to the sequence "00001, 00011, 00101, 00111, . . . , 11101, 11111".

Thus permutation number p ranges in value from 1 to $N_p$ in increments of 2. The individual Demichal factors (defined for example in Vigianno 1990) used in Neugebauer may now be defined by a function which returns x if a solid color separation denoted by s is "on" and (1-x) if the solid color is "off" for a particular Neugebauer primary denoted by permutation number p:

$$f(x, s, p) = x \text{ if } ((p \gg s) \& 0 \times 1 == 0 \times 1) \qquad \text{Eq. 40}$$
$$f(x, s, p) = 1 - x \text{ if } ((p \gg s) \& 0 \times 1 == 0 \times 0)$$
$$\text{Demichal}(\vec{x}, p) = \prod_{s=1}^{s=N_s} f(g(x_s, \Delta_s), s, p)$$

Thus, the expression for a particular Neugebauer primary $R(N_s,p)$ is determined iteratively beginning with s=1, then calculating s=2, up to $s=N_s$, each time using the preceding calculation for R(s,p) from the expression above. The variable $z_s'$ is replaced with the function f(1,s,p) which indicates that $z_s'$ is either full thickness ($z_s'=1$) or no thickness ($z_s'=0$). For simplicity of writing the equation, the dependence of R() on the separation values $x_s$, $x_{s-1}$, $x_{s-2}$, . . . , $x_1$, and dot size increase $\Delta_s$, $\Delta_{s-1}$, $\Delta_{s-2}$, . . . , $\Delta_1$ is implicitly assumed by defining vector $x_s$ and $\Delta_s$:

$$R_j(s, p, x_s, x_{s-1}, \ldots, x_1, \Delta_s, \Delta_{s-1}, \ldots, \Delta_1) = R_j(s, p, \vec{x_s}, \vec{\Delta_s}) \qquad \text{Eq. 41}$$

where $$\vec{x_s} = (x_s, x_{s-1}, \ldots, x_1)$$
$$\vec{\Delta_s} = (\Delta_s, \Delta_{s-1}, \ldots, \Delta_1)$$

Accordingly, the full expression for vector R() in terms of its components is:

$$R_j(s, p, \vec{x_s}, \vec{\Delta_s}) = \frac{\begin{array}{c}(\rho_{s\infty}R_{sj0} - R_j(s-1, p, \vec{x_{s-1}}, \vec{\Delta_{s-1}}))\\ e^{-\beta T \alpha_{sj0}(f(1,s,p)+\delta_s(x_s,\Delta_s))} -\\ \rho_{s\infty}R_{sj0}(1 - R_j(s-1, p, \vec{x_{s-1}}, \vec{\Delta_{s-1}}))\end{array}}{\begin{array}{c}\rho_{s\infty}R_{sj0}(\rho_{s\infty}R_{sj0} - R_j(s-1, p, \vec{x_{s-1}}, \vec{\Delta_{s-1}}))\\ e^{-\beta T \alpha_{sj0}(f(1,s,p)+\delta_s(x_s,\Delta_s))} -\\ (1 - R_j(s-1, p, \vec{x_{s-1}}, \vec{\Delta_{s-1}})\rho_{s\infty}R_{sj0})\end{array}} \qquad \text{Eq. 42}$$

According to an embodiment of the invention, these calculated values for the Neugebauer primaries, Demichal factors, and the expression for dot size correction $g(x,\Delta_i)$ are incorporated into the tristimulous version of the Neugebauer equation:

$$R_j(\vec{x})_{Total} = \sum_{\substack{p=1\\ incr=2}}^{p=N_p-1} R_j(N_s, p, \vec{x_{N_s}}\vec{\Delta_{N_s}}) \prod_{s=1}^{s=N_s} f(g(x_s, \Delta_s), s, p) \qquad \text{Eq. 43}$$

where $\vec{x} = (x_1, x_2, x_3, \ldots, x_{N_s})$

Note that for fixed colorant sets of N-colorants, the above expression can easily be modified to address inaccuracies in estimating overprints. Unlike the case where one has a large number of spot colorants and limited measurement data, typically measurement data is readily obtained in situations of a fixed colorant set. Although charts and data sets are less standardized for N>4, in general they will always include the key boundary information, i.e. the Neugebauer primaries. A multiplicative correction vector can be defined for each Neugebauer primary overprint for either the broad band RGB approach (i.e. a 3-vector), or for the full spectral approach (i.e. an "n-vector" where "n" is the number of spectral channels). Alternatively a continuous correction function of λ can be defined rather than a discrete function. By means of correcting the Neugebauer primaries, the accuracy of relative changes in L*a*b* can be preserved while ensuring absolute accuracy of L*a*b* at the boundary values. The least square fits to optimize the physical parameters of this invention can be performed before and/or after the above empirical corrections are applied to obtain accurate Neugebauer primaries in the special case of fixed colorants.

It is also to be noted that the above method of fully capturing in parametric form the behavior of real printing is of value for conventional profiling of CMYK. This is because relatively few measurements are required to construct and/or to update a profile. It is also of value because of the accuracy of estimation why modifying color values of the substrate or the densities of the colorants.

Additionally, an optional change-in-density-from-a-previously-printed-job parameter $\Delta D_s/D_s$ may be added to the database 402, described below and may be calculated either automatically or modified manually. This parameter may be used by multiplying the exponents in equation 42 by $(1.0+\Delta D_s/D_s)$ in a manner similar to equation 20. In this context, $\Delta D_s/D_s$ is the relative change in density for separation number "s".

Once the preferred or optimal values of all the parameters have been determined from measured data via least squares fit, future evaluations of R( ) can be accelerated by discounting any tint values $x_i$ of the tint vector x which are 0. This can be performed via the calculation for the number of permutations $N_p$:

$$N_p = 1 + \sum_{s=0}^{s=N_s} h(2^s, x_s) \qquad \text{Eq. 44}$$

where $h(2^s, x_s) = 2^s$ for $x_s > 0$ $h(2^s, x_s) = 0$ for $x_s = 0$

According to an embodiment of the present invention, all iterations and calculations for separation s are skipped if $(N_p >> s \ \& \ 0 \times 1) == 0 \times 0$. Note that further acceleration may be gained by replacing the most costly calculation (i.e. exp(x)) with a LUT with reasonable range for x, i.e.

$-4 < x < 0$

It was found that by precalculating a floating point LUT for exp(x) with a granularity of 0.0001 (i.e. 10,000 increments), there was no discernable degradation to the estimations of L*a*b*.

As described in section I, the values of L*a*b* can be converted to XYZ and from there to RGB and back, using the standard equations for CIELAB to convert from L*a*b* to XYZ and standard matrix conversions from XYZ to RGB. Note that the matrix used to convert to and from RGB and XYZ can be characterized conveniently in terms of RGB chromaticities xy and the chromacity of the white point of the reference illuminant (for example D50):

$$M = \begin{pmatrix} X_r & X_g & X_b \\ Y_r & Y_g & Y_b \\ Z_r & Z_g & Z_b \end{pmatrix} \qquad \text{Eq. 45}$$

$= M(x_r, y_r, x_g, y_g, x_b, y_b, x_{D50}, y_{D50})$

The chromaticity values can be optimized using least square fits of the results of equation 43 to various measured spot colorant data sets.

Figure 4:
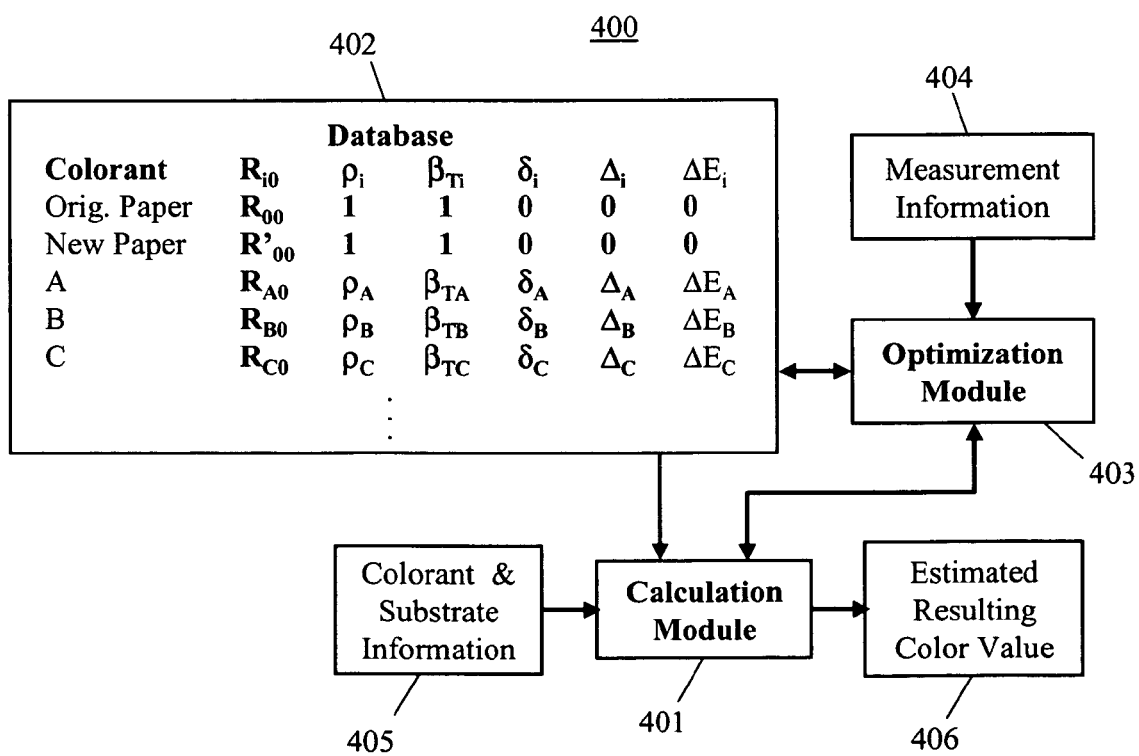
FIG. 4 illustrates a system for executing a method for estimating a resulting color value of a plurality of colorants mixed on a substrate, regardless of whether the colorants are individually printed in a solid or a tinted manner, according to an embodiment of the present invention.

According to an embodiment of the present invention shown in FIG. 4, Equation 43, above, may be used as part of a computer-based system 400 to estimate resulting color value of mixed colorants, spot or otherwise, when such mixed colorants are printed solidly or in a tinted manner on a substrate.

The embodiment of FIG. 4 includes a calculation module 401, which may be implemented by the computer system 101 in FIG. 1, that calculates the reflectance values RGB for a given combination of colorants 405 A, B, C, etc., printed on the substrate. Information identifying the colorants 405 or their attributes may be input to the calculation module 401 via an input source 102 shown in FIG. 1. Each colorant layer, including the substrate, according to an embodiment of the invention, may have initial color information, such as values of L*a*b*; initial trap information, such as trap factor $\beta_T$; and, optionally: (a) smear information, such as smear factor δ; (b) dot growth information, such as dot growth Δ; and (c) opacity information, such as opacity factor ρ stored in a database 402. The database 402 may be included in the data storage system 104 shown in FIG. 1. As an alternative to L*a*b*, according to an embodiment of the invention, values of $\alpha_{RGB}$ can be computed directly from the reflectance XYZ measurements of the substrate and each of the colorants converted to RGB via the XYZ->RGB matrix described above, and stored. Note that the values of $\alpha_{RGB}$ are highly dependent on choice of XYZ->RGB matrix. It may therefore be preferable to calculate the values of $\alpha_{RGB}$ dynamically from the original CIELAB or similar data. As discussed in the above sections, the initial values of the other parameters can be based on an average of many colorants previously calculated, or based on the computed parameters for CMYK, where the initial estimate is based on the CMYK colorant most similar to the colorant being initialized.

According to an embodiment of the present invention, an optimization module 403 compares a set of measurement information 404 to the resulting color values estimated from calculation module 401. The measurement information 404 may be input to the optimization module 403 via an input source 102, shown in FIG. 1. Further, the measurement information 404 may include various combinations of colorants 405 A, B, C, etc. The optimization module 401 may determine preferred or updated values of dot smear δ, dot growth Δ, trap $\beta_T$, and opacity ρ for each colorant 405, according to an embodiment of the invention. The optimization module 403, according to an embodiment of the present invention, may utilize a least squares fit to determine the updated values of dot smear δ, dot growth Δ, trap $\beta_T$, and opacity ρ for each colorant 405 in order to minimize the error between estimation and measurement. Database 402 may be updated as more accurate values of the colorant parameters are calculated.

Optimization module 403 also may generate new estimates for $\Delta E_i$.

Results and Analysis:

A study demonstrating the calculations described above with reference to FIG. 4 was performed using SWOP TR001 data. A least squares fit was performed simultaneously on the independent channel parameters dot smear factor, dot growth factor, trap, opacity, and RGB working space chromaticities $(x_r, y_r, x_g, y_g, x_b, y_b)$ for the channels CMYK of the TR001 data set. The first 200 values of the TR001 set were used as training data, the entire set was used as test validation data. With the following set of parameters, the average error between estimation and theory is 1.6 $\Delta E$, max 4.7 $\Delta E$:

TABLE 1

| C | M | Y | K |
|---|---|---|---|
| Dot_Size_Increases | | | |
| 0.10031 | 0.0752591 | 0.0603541 | 0.1704 |
| SmearFactors | | | |
| 0.149189 | 0.172752 | 0.209429 | 0.0434729 |
| Traps | | | |
| 0.786224 | 1.01007 | 0.75 | 0.345693 |
| Opacities | | | |
| 0.001 | 0.00374522 | 0.112346 | 0.433172 |

| RGB_xy | |
|---|---|
| X | Y |
| R 0.674515 | 0.293735 |
| G 0.200429 | 0.845835 |
| B 0.117618 | 0.0293126 |

Note that the value of 0.75 for yellow trap is the default initialized value. This value remained 0.75 because yellow was the $4^{th}$ colorant down—hence there was no overprint data to determine a different value.

As the sample set of data grows for different inks, the optimal values of RGB working space xy's may be adjusted thereby affecting the estimated value of trap for the colorants. Once the sample set has reached an adequate size, the values of RGB chromaticity should become frozen as a standard and the least squares fit should be performed on the values of dot size increase, smear factor, trap, and opacity only for each of all the inks.

Also note that since the values of RGB may be regarded as broad band estimates of the total spectrum for each colorant, N channels with N>3 can be used for greater accuracy, up to and including the full set of spectral measurements N=32 (for example). Least square fit optimizations can be performed to determine the optimal correlation of the N channels for each colorant and the value of XYZ for the colorant solid. Alternative approaches might be to broaden the spectral sampling of each colorant to correspond to N channels, then adjust the result as necessary to achieve a good mapping of the N channels to XYZ and back.

Further note that the errors quoted above are at their maximum at the Neugebauer primaries. This is because no attempt was made to perform an empirical correction to the estimate of the reflectance values for each mix combination, i.e. the above calculation was performed using characterizations of each separate channel or colorant only. It should be obvious to those of average skill in the art that given a set of actual measured overprint CIELAB or spectral data, one can correct the estimates of the Neugebauer primaries empirically to ensure and exact match between the model and the data. If this is performed, the accuracy of the resulting model will be very close to the noise of the measured data, i.e. average error between theory and measurement of 0.5 $\Delta E$, max of 1 or 2 $\Delta E$.

Determining Laydown Sequence:

In subsequent studies of measured data, it was found that the laydown sequence documented either during the creation of a pre-press digital proof or during a print run might be incorrect. In fact, it should not always be assumed that CMYK will be printed together in conjunction with extra spot colorants. This possibility dictates the need for automated determination of laydown sequence after the fact. This was successfully performed by performing a least squares fit on pairs of colorants. A "bubble algorithm" was used, whereby the default laydown sequence was assumed to be the sequence as indicated in the measurement data file (measurement data files such as CGATS typically indicate the device code values in columns which are labeled, for example, CMYK_C, CMYK_M, RED, VIOLET, etc.). Assuming colorants in sequence ABC . . . , a least squares fit is first performed on the trap and opacity parameters for colorant combination A+B, then B+A. If the error is lowest for the original order, A+B, the relative ordering between A and B remains the same, otherwise, the order is changed to BAC . . . . The next pair is likewise either left the same or swapped with regard to laydown sequence.

After each pair has been processed in this manner, the above process begins again starting at the beginning. If at least one swap is required, the entire process will be repeated. If no swaps occur, the laydown optimization process is "done". Once the optimal laydown sequence is determined, the overall parameter optimizations described in previous sections for all the parameters can be performed.

Mixing Spot and CMYK:

As demonstrated above, embodiments of the present invention can be used to create a reasonable description of a CMYK printing process as captured in the SWOP TR001 data set. To the extent that accurate channel parameters have been determined, one skilled in the art will appreciate that the present invention may be used to estimate a resulting appearance of a mixture of spot colorant solids and tints with one another. Further, an embodiment of the present invention estimates a resulting appearance of a mixture of spot colorants with CMYK colorants, which can be difficult if, as is now often the case, the CMYK process has already been carefully captured in the form of a CMYK ICC profile or an equivalent thereof.

To elaborate, in many workflows involving proofing, significant effort may have been done to optimize the CMYK profile. Since there is often noise in the CMYK measurements used to build the ICC profile, as well as imperfections in the algorithms used to create the profile, it is common practice for the user to modify or edit the CMYK profile in order to achieve an acceptable proof (e.g. an ink jet simulation) or an acceptable conversion (e.g. SWOP to GraCol or SNAP).

Thus, in light of the all too common situation described above, it is desirable to leave existing CMYK simulations unchanged while at the same time calculate an accurate estimation for L*a*b* of spot colorants mixing with these existing CMYK colorants. According to an embodiment of the present invention, a straightforward solution to achieve both requirements is provided. In particular, $\vec{F}_P(\vec{x}_1)$ is defined to be the interpolated estimation function for the ICC profile, where the input vector $x_1$ denotes (C,M,Y,K) and output vector F denotes L*a*b*which has been converted to the vector (R,G,B) using the RGB Working space optimized for the spot colorants. Likewise, $\vec{F_s}(\vec{x}_2)$ is defined to be the estimation vector function for CMYK+S5+S6+ ... $S_{N_S}$ from the KMN (Kubelka-Munk-Neugebauer) method above where:

$$\vec{x}_2 = (C,M,Y,K,s_5,s_6,s_7,\ldots s_{N_S}) \qquad \text{Eq. 46}$$

The mixture function $F_{p+s}(\ )$ defining the profile-based CMYK characterization and the KMN together is:

$$\vec{F_{p+s}}(\vec{x_2}) = \vec{F_p}(\vec{x_1}) + (\vec{F_s}(\vec{x_2}) - \vec{F_s}(\vec{x_1})) \qquad \text{Eq. 47}$$

Note that as the spot colorants converge to value 0, $F_{p+s}(\vec{x}_2) \rightarrow \vec{F_p}(\vec{x}_1)$. Also note that the $\Delta D_s/D_s$ parameter discussed above in connection with Equation 42 can be used, for example, in cases where the known density is lower. If there is no available data for spot colorants for a specific type of printing such as newsprint, but it is known that in general that the density of colorants is about 30% lower for the same inks printing on newsprint vs. SWOP, then the database 402 can multiply the exponents in equation 42 for the corresponding spot colorants by (0.7 =1.0−0.3) when utilizing equation 42 in the Spot Colorant Calc module. Note that this adjustment can be used to estimate the impact of higher or lower densities for proofing CMYK as well, for example in the case of proofing adjacent to a printing press. The same is true for any fixed N-colorant printing system. This can be accomplished by means of the expression:

$$\vec{F_{p+s}}(\vec{x_1}) = \vec{F_p}(\vec{x_1}) + (\vec{F_s}(\vec{x_1},\vec{\Delta D/D}) - \vec{F_s}(\vec{x_1},0)) \qquad \text{Eq. 48}$$

where the vector $\Delta D/D$ indicates the relative changes in densities for each of color separations utilized in equation 42 as described above, and the vector $x_1$ is the N-vector of device code values for the N-Colorant system.

It is to be understood that the exemplary embodiments are merely illustrative of the present invention and that many variations of the above-described embodiments can be devised by one skilled in the art without departing from the scope of the invention. It is therefore intended that all such variations be included within the scope of the following claims and their equivalents.

| PARTS LIST | |
|---|---|
| 101 | computer system |
| 102 | input source |
| 103 | output source |
| 104 | data storage system |
| 200 | computer-based system |
| 201 | calculation module |
| 202 | database |
| 203 | optimization module |
| 204 | measurement information |
| 205 | colorant |
| 206 | estimated resulting color value |
| 300 | computer-based system |
| 301 | calculation module |
| 302 | database |
| 303 | optimization module |
| 304 | measurement information |
| 306 | color value |
| 400 | computer-based system |
| 401 | calculation module |
| 402 | database |
| 403 | optimization module |
| 404 | measurement information |
| 405 | colorant |

What is claimed is:

1. A computer-implemented method for estimating a resulting color value of a colorant when deposited on a substrate, the method comprising the steps of:
    receiving color information describing at least a color value of the colorant and a color value of the substrate;
    receiving smear information describing smear characteristics associated with the colorant;
    estimating the resulting color value based at least upon the color information and the smear information;
    further comprising the step of receiving tint information describing an amount of tint of the colorant, wherein the estimating step estimates the resulting color value based at least upon the color information, the smear information, and the tint information; and
    wherein the estimating step utilizes a model that characterizes both halftone and contone behavior.

2. The computer-implemented method of claim 1, wherein the color value of the colorant is a device-dependent color value.

3. The computer-implemented method of claim 1, wherein the color value of the substrate is a device-dependent color value.

4. The computer-implemented method of claim 1, wherein the resulting color value is a device-dependent color value.

5. The computer-implemented method of claim 1, wherein the smear information specifies a characteristic pertaining to a spreading of a printed dot of the colorant.

6. The computer-implemented method of claim 1, wherein the colorant is a spot colorant other than regular cyan, magenta, yellow, and black process colorants.

7. The computer-implemented method of claim 1, wherein the estimating step utilizes a model that characterizes halftone behavior.

8. The computer-implemented method of claim 1, wherein the model utilizes a combination of Neugebauer and Kubelka-Munk models.

9. The computer-implemented method of claim 8, wherein the Kubelka-Munk model is simplified into Bier's law.

10. A computer-accessible memory system retaining computer instructions that, when executed, or installed and executed, cause one or more computers to perform a method for estimating a resulting color value of a spot colorant when deposited on a substrate, the method comprising the steps of:
    receiving color information describing at least a color value of the spot colorant and a color value of the substrate;
    receiving smear information describing smear characteristics associated with the spot colorant;
    estimating the resulting color value based at least upon the color information and the smear information; and
    wherein the estimating step utilizes a model that characterizes both halftone and contone behavior.

11. The computer-accessible memory system of claim 10, wherein the method further comprises the step of receiving error information describing an error between the estimated resulting color value and a measured color value, the measured color value obtained from a measurement taken from a deposition of the spot colorant, wherein the error information reports an error of a same magnitude as expected error due to noise in measurement data from the measurement.

* * * * *